(12) United States Patent
Johansson et al.

(10) Patent No.: US 8,780,754 B2
(45) Date of Patent: Jul. 15, 2014

(54) METHOD AND CONTROLLING NETWORK NODE IN A RADIO ACCESS NETWORK

(75) Inventors: Klas Johansson, Sundbyberg (SE); Stephen Craig, Nacka (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 232 days.

(21) Appl. No.: 13/513,030

(22) PCT Filed: Apr. 26, 2012

(86) PCT No.: PCT/SE2012/050437
§ 371 (c)(1),
(2), (4) Date: May 31, 2012

(87) PCT Pub. No.: WO2013/025146
PCT Pub. Date: Feb. 21, 2013

(65) Prior Publication Data
US 2013/0286865 A1    Oct. 31, 2013

Related U.S. Application Data (60) Provisional application No. 61/524,623, filed on Aug. 17, 2011.

(51) Int. Cl.
*H04W 24/02* (2009.01)

(52) U.S. Cl.
USPC .......................................................... 370/252

(58) Field of Classification Search
CPC .............................. H04W 36/18; H04W 36/30
USPC .................. 370/252, 350, 400, 336; 455/507
See application file for complete search history.

(56) References Cited

U.S. PATENT DOCUMENTS

| | | | | |
|---|---|---|---|---|
| 5,995,533 | A * | 11/1999 | Hassan et al. | 375/140 |
| 6,347,091 | B1 * | 2/2002 | Wallentin et al. | 370/437 |
| 6,965,568 | B1 * | 11/2005 | Larsen | 370/238 |
| 7,263,371 | B2 * | 8/2007 | Das et al. | 455/456.1 |
| 7,676,223 | B2 * | 3/2010 | Das et al. | 455/422.1 |
| 8,103,310 | B1 * | 1/2012 | Srinivas et al. | 455/561 |
| 8,254,949 | B2 * | 8/2012 | Tafreshi | 455/453 |
| 2001/0006513 | A1 * | 7/2001 | Kim | 370/331 |

(Continued)

FOREIGN PATENT DOCUMENTS

| | | |
|---|---|---|
| EP | 2166795 A1 | 3/2010 |
| GB | 2454872 A | 5/2009 |
| WO | 2008061338 A1 | 5/2008 |
| WO | 2009011756 A1 | 1/2009 |

*Primary Examiner* — Asad Nawaz
*Assistant Examiner* — Parth Patel
(74) *Attorney, Agent, or Firm* — Coats and Bennett P.L.L.C.

(57) ABSTRACT

Method and controlling network node (140) for transmitting data to a user equipment (130) over a set of radio links (115, 125), when a radio link (115, 125) is added, or removed. The controlling network node (140) is configured to communicate data to the respective radio network node (110, 120) over a respective backhaul link (118, 128), of which at least one backhaul link (118) is connected over an Internet Protocol, IP, network (150). The method (500) comprises measuring (501) the time delay over the corresponding backhaul link (118, 128) for each radio link (115, 125), determining (502) time difference between them, calculating (503) a buffer time for each radio link (115, 125), and buffering (507) data in a buffer (625) for the calculated period of time before forwarding the data to the radio network node (110, 120), for transmission to the user equipment (130).

21 Claims, 5 Drawing Sheets

(56) References Cited

U.S. PATENT DOCUMENTS

| | | | |
|---|---|---|---|
| 2003/0048810 A1* | 3/2003 | Kermade et al. | 370/503 |
| 2004/0015579 A1* | 1/2004 | Cooper et al. | 709/223 |
| 2004/0072568 A1* | 4/2004 | Kim | 455/445 |
| 2004/0218615 A1* | 11/2004 | Griffin et al. | 370/401 |
| 2005/0025100 A1* | 2/2005 | Lee et al. | 370/335 |
| 2005/0039101 A1* | 2/2005 | Torsner | 714/748 |
| 2006/0058056 A1* | 3/2006 | Das et al. | 455/524 |
| 2006/0223585 A1* | 10/2006 | Legg | 455/560 |
| 2006/0227796 A1* | 10/2006 | Wei et al. | 370/412 |
| 2007/0047495 A1 | 3/2007 | Ji et al. | |
| 2007/0140123 A1* | 6/2007 | Fukui | 370/235 |
| 2007/0183323 A1* | 8/2007 | Hannu et al. | 370/230 |
| 2007/0233721 A1* | 10/2007 | Bazar | 707/101 |
| 2007/0297415 A1* | 12/2007 | Lee et al. | 370/395.4 |
| 2008/0069043 A1* | 3/2008 | Kimura et al. | 370/329 |
| 2009/0190569 A1* | 7/2009 | Hacena | 370/350 |
| 2010/0142477 A1* | 6/2010 | Yokota | 370/331 |
| 2010/0154013 A1* | 6/2010 | Mas Ivars | 725/109 |
| 2010/0309883 A1* | 12/2010 | Nagasawa et al. | 370/331 |
| 2010/0322188 A1* | 12/2010 | Nagatake et al. | 370/331 |
| 2011/0019580 A1* | 1/2011 | Nagasawa et al. | 370/252 |
| 2011/0070907 A1* | 3/2011 | Chou | 455/507 |
| 2011/0142056 A1* | 6/2011 | Manoj | 370/400 |
| 2012/0120927 A1* | 5/2012 | Bucknell | 370/336 |
| 2012/0281558 A1* | 11/2012 | Anderson et al. | 370/252 |
| 2012/0294179 A1* | 11/2012 | Tafreshi | 370/252 |
| 2013/0121272 A1* | 5/2013 | Barbieri et al. | 370/329 |
| 2013/0148579 A1* | 6/2013 | Das et al. | 370/328 |
| 2013/0223365 A1* | 8/2013 | Choi et al. | 370/329 |
| 2013/0235844 A1* | 9/2013 | Ge et al. | 370/331 |
| 2013/0242781 A1* | 9/2013 | Hui et al. | 370/252 |

* cited by examiner

METHOD AND CONTROLLING NETWORK NODE IN A RADIO ACCESS NETWORK

TECHNICAL FIELD

The disclosed subject matter relates to various embodiments of a method and a controlling network node in a radio access network. More particularly, the disclosed embodiments relates to a mechanism for performing a handover in a radio access network.

BACKGROUND

User equipment (UE), also known as mobile stations, wireless terminals and/or mobile terminals are enabled to communicate wirelessly in a wireless communication network, sometimes also referred to as a cellular radio system. The communication may be made e.g. between two user equipment units, between a user equipment and a regular telephone and/or between a user equipment and a server via a Radio Access Network (RAN) and possibly one or more core networks.

The user equipment units may further be referred to as mobile telephones, cellular telephones, laptops with wireless capability. The user equipment units in the present context may be, for example, portable, pocket-storable, hand-held, computer-comprised, or vehicle-mounted mobile devices, enabled to communicate voice and/or data, via the radio access network, with another entity, such as another user equipment or a server.

The wireless communication system covers a geographical area which is divided into cell areas, with each cell area being served by a network node, or base station e.g. a Radio Base Station (RBS), which in some networks may be referred to as "eNB", "eNodeB", "NodeB" or "B node", depending on the technology and terminology used. The network nodes may be of different classes such as e.g. macro eNodeB, home eNodeB or pico base station, based on transmission power and thereby also cell size. A cell is the geographical area where radio coverage is provided by the network node/base station at a base station site. One base station, situated on the base station site, may serve one or several cells. The network nodes communicate over the air interface operating on radio frequencies with the user equipment units within range of the respective network node.

In some radio access networks, several network nodes may be connected, e.g. by landlines or microwave, to a Radio Network Controller (RNC) e.g. in Universal Mobile Telecommunications System (UMTS). The RNC, also sometimes termed a Base Station Controller (BSC) e.g. in GSM, may supervise and coordinate various activities of the plural network nodes connected thereto. GSM is an abbreviation for Global System for Mobile Communications (originally: Groupe Spécial Mobile).

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units. The 3GPP has undertaken to evolve further the UTRAN and GSM based radio access network technologies.

In the present context, the expressions downlink, downstream link or forward link may be used for the transmission path from the network node to the user equipment. The expression uplink, upstream link or reverse link may be used for the transmission path in the opposite direction i.e. from the user equipment to the network node.

Functionality to handle user mobility is a fundamental component in wireless communication systems. From a service quality perspective, such functionality must ensure that service continuity is maintained as user equipments move from one cell to another during an active session, and that each new session is established in a sufficiently good radio environment. From a spectral efficiency perspective, such functionality should ensure that an active user is always served by the most appropriate base station or base stations, which typically means the closest base station/s in a radio sense.

Macro diversity through soft handover has proven to be a key feature of CDMA-based cellular networks such as WCDMA. As specified by 3GPP, WCDMA is a wireless multiple access protocol based on code division multiple access, distributed Signal-to-Interference-Ratio (SIR) based power control operating at 1500 Hz, frequency reuse one, (partially) non orthogonal data and control channels.

Effective interference control is a must for high performing WCDMA networks, not only to maximize achievable data rates and capacity, but also to achieve stable control channel performance—which in turn is needed to meet end user and operator expectations on service continuity and retainability (measured e.g. as dropped call rate). In this context, soft handover is a key method to cope with high interference, poor coverage, and user mobility.

Soft handover, or soft handoff as it also may be referred to, refers within the present context to a feature used within some wireless communication networks based on CDMA/WCDMA standards, where a user equipment is simultaneously connected to two or more cells (or cell sectors) during a call/connection.

More specifically, soft handover serves as a means to achieve interference control, robust "make before break" handovers, and diversity with respect to fading radio channels caused by multi-path interference and shadowing effects.

In WCDMA according to 3GPP Release 99 as well as later enhancements such as High Speed Downlink Packet access (HSDPA) and High Speed Uplink Packet access (HSUPA), mobility management is handled by the Radio Network Controller (RNC). The RNC determines on the fly which cells should constitute the active set: i.e., the cells that a user equipment is connected to simultaneously in a soft handover fashion. To help the RNC prioritize between candidate cells, the user equipment estimates the signal quality or signal strength of the Primary Common Pilot Channel (P-CPICH) transmitted on the downlink in each cell. The UE reports this information to the RNC in an event-triggered or periodic manner.

Soft handover is supported for Dedicated Channels (as of 3GPP Rel-99) and for HSUPA (as of 3GPP Rel-6). However, to simplify the network architecture soft handover was not introduced for the High Speed Downlink Shared Channel (HS-DSCH), High Speed Shared Control Channel (HS-SCCH) and High Speed Dedicated Physical Control Channel (HS-DPCCH) in HSDPA (Rel-5).

The macro diversity functionality for the downlink dedicated channels relies on synchronous (time aligned) transmissions over the Uu interface (i.e., over the air). In the user equipment, signals received from all cells that are currently part of the active set are combined in the receiver. By time aligning the transmissions, a minimum of buffering is required in the user equipment, thereby reducing complexity and improving performance.

The radio access network has been designed to facilitate synchronous transmission in different radio links, transmitted from the same or different base stations (or NodeBs).

Figure 1:
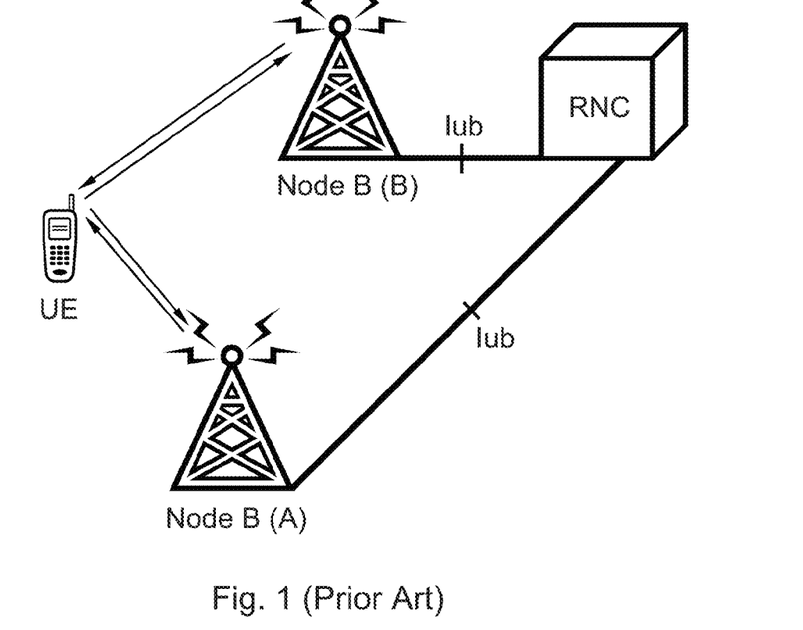
FIG. 1 is a schematic block diagram illustrating a radio access network according to prior art.

This behaviour is accomplished by an interaction of the radio network controller, which hosts the Radio Link Control (RLC) protocol, and the base stations, as illustrated in FIG. 1. A frame control over the Iub interface (connecting the NodeB and RNC) comprises tight timing adjustment, such that downlink data frames are transmitted within a certain restricted window of time. The connection between the NodeB and the RNC is also referred to as backhaul link. Further limited buffering in the NodeB then enables data frames to be transmitted at exactly the same time over the air, for compensating for jitter etc.

Figure 2:
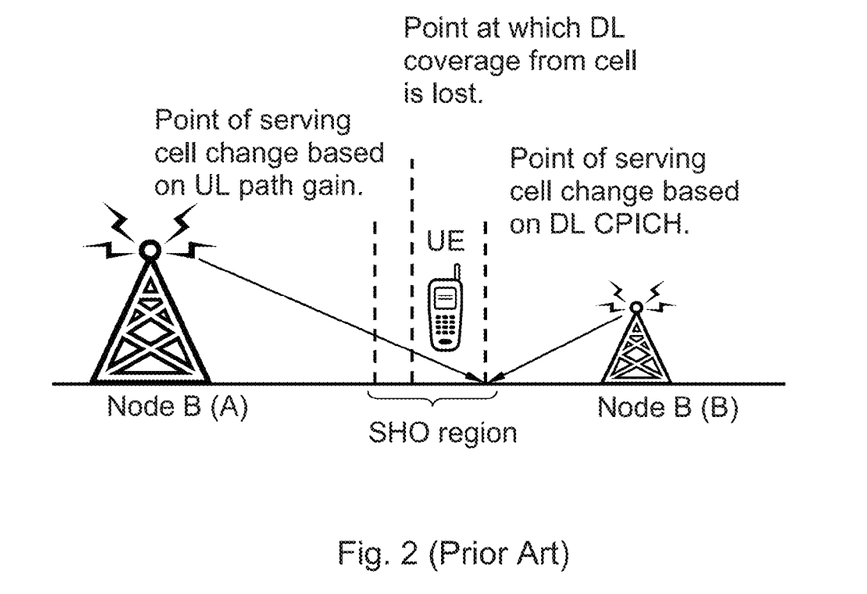
FIG. 2 is a schematic block diagram illustrating a radio access network and a handover scenario according to prior art.

Soft handover also has other merits, for example to handle imbalances of downlink and uplink path loss with respect to adjacent cells. Especially in heterogeneous networks, composed of base stations of different output power, it is likely that the best cell with respect to the uplink and the downlink are different. To maximize downlink and uplink channel quality, e.g. represented by the SIR, the user equipment would need to connect to different base stations in each link. This is because, as illustrated in FIG. 2: the uplink path gain (inverse of path loss) and interference level at the base station receiver will determine the best server in the uplink, and the downlink Ec/N0 (which is dependent on base station powers, path gain, and downlink interference level) will determine the best server in the downlink.

However, by means of soft handover, an optimum handover decision can be done for downlink while keeping the best possible uplink radio link as part of the active set. Hence the achievable data rate and signalling quality for the user of interest can be maximized simultaneously for downlink and uplink, respectively.

Another virtue of soft handover exploited for the uplink is Inter-Cell Interference Control (ICIC), which relies on: Soft Handover (SHO) in conjunction with inner-loop power control. These mechanisms ensure that the user equipment utilizes a transmit power so that the SIR target is met only for the strongest radio link.

Further, the HSUPA overload indicator (relative grant). For HSUPA connections, this may be sent from the non-serving Node-B on the Enhanced Relative Grant Channel (E-RGCH). By means of the overload indicator a non-serving cell may command the user equipment to reduce its grant.

Having tight interference control and "make before break" handovers means the mobility mechanisms do not need to be as precise. Hence they allow for relaxed requirements on accuracy of mobility measurements in the user equipment and ensure robust system performance in dynamic radio environments.

Observe that in the sequel the terms Iub, backhaul, and transmission are used interchangeably to describe the connection between RNC and NodeB.

To be able to attach a NodeB via an IP network to an RNC is an interesting concept. Thereby it may be possible to attach for example a femto cell to the network in a convenient manner. However, the prolonged signal propagation time that would result from the backhaul signalling over the IP network makes soft handover difficult to implement. If links of the active set belonging to different NodeBs are subject to different backhaul transmission delays, which could be the case especially over best effort IP transport networks, all links of an active set need to await the worst possible link. I.e., it is the base station having the maximum possible backhaul delay that determines the point of transmission over the air interface in all cells. Higher delay means degraded service quality, larger buffering requirements, and decreased node capacity.

Therefore, in a traditional WCDMA system, strict requirements on backhaul delay characteristics have been employed. The tolerated average delay and jitter (delay variation) were determined to achieve reasonable buffer size and a low impact on service quality, primarily driven by the generally accepted perception of adequate speech quality.

Current Iub frame protocol synchronization procedures are thus relying on relatively low variations in delay, and the maximum difference between links in the active set may not be too high. This reliance is not compatible with the generally looser delay characteristics of best effort IP transport networks.

Static adjustments to the looser characteristics in accordance with prior art techniques are not appealing for the reasons of service quality and node complexity described above.

SUMMARY

It is the object to obviate at least some of the above disadvantages and provide an improved performance in a radio access network.

The object is achieved by a method in a controlling network node situated in a radio access network. The method aims at transmitting data to a user equipment over a set of radio links, when one radio link is added, or removed, from the set of radio links. Each radio link is connected to the user equipment and to a radio network node. The controlling network node is configured to communicate data to the respective radio network node over a respective backhaul link of which at least one backhaul link is connected over an Internet Protocol (IP) network. The method comprises measuring the time delay over the corresponding backhaul link for each radio link in the set of radio links. Further, the method comprises determining a time difference between the shortest measured time delay and the longest measured time delay. Also, in addition, the method comprises calculating a buffer time for each radio link in the set, based on the determined time difference and the measured time delay. Furthermore, the method also comprises buffering data in a buffer associated with each respective radio link, for the calculated period of time, before forwarding the data to the radio network node, for transmission over the radio link to the user equipment.

The object is also achieved by a controlling network node. The controlling network node is comprised in a radio access network. The controlling network node is configured for performing a method for transmitting data to a user equipment over a set of radio links, when one radio link is added, or removed, from the set of radio links. Each radio link is connected to the user equipment and to a radio network node. The controlling network node is configured to communicate data to the respective radio network node over a respective backhaul link, of which at least one backhaul link is connected over an Internet Protocol network. The controlling network node comprises a processing circuit. The processing circuit is configured for measuring the time delay over the corresponding backhaul link for each radio link in the set of radio links. Also, the processing circuit is in addition configured for determining a time difference between the shortest time delay and the longest time delay, and further configured for calculating a buffer time for each radio link in the set, based on the determined time difference and the measured time delay. Furthermore, the controlling network node comprises a buffer memory, configured for buffering data, which buffer memory is associated with each respective radio link for the calculated period of time before the data is forwarded to the radio network node for transmission, over the radio link, to the user equipment.

Thanks to some embodiments described herein, a faster adaptation of Iub frame protocol timing adjustments is provided when radio links with different Iub delay characteristics are added or removed from the active set of radio links. Further, embodiments may provide a graceful degradation of the macro diversity combining gain when buffering is not possible in order to even out variations and systematic differences in backhaul delay on different radio links within the same active set. Also, a maintained performance may be made even when a long backhaul delay is experienced on a subset of links in the active set. Also, establishment and maintenance of air interface synchronization on multiple radio links, configured towards different base stations, although the delay is too high for successful data frame transmission over the backhaul link connecting at least one of the radio base stations. Furthermore, adaptation of radio network nodes or controlling network nodes buffer length to minimize the overall buffer size required while tracking changing jitter characteristics on the Iub transport network; and preserved service quality and maintained node capacity in a cellular network environment with poor or variable backhaul characteristics. Thus an improved performance in a radio access network is provided.

BRIEF DESCRIPTION OF THE DRAWINGS

The present methods and network nodes will now be described more in detail in relation to the enclosed drawings, in which.

DETAILED DESCRIPTION

Embodiments herein are defined as a controlling network node and a method in a controlling network node, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. It is further to be understood that the drawings are not necessarily drawn to scale and that, unless otherwise indicated, they are merely intended to conceptually illustrate the structures and procedures described herein.

Figure 3:
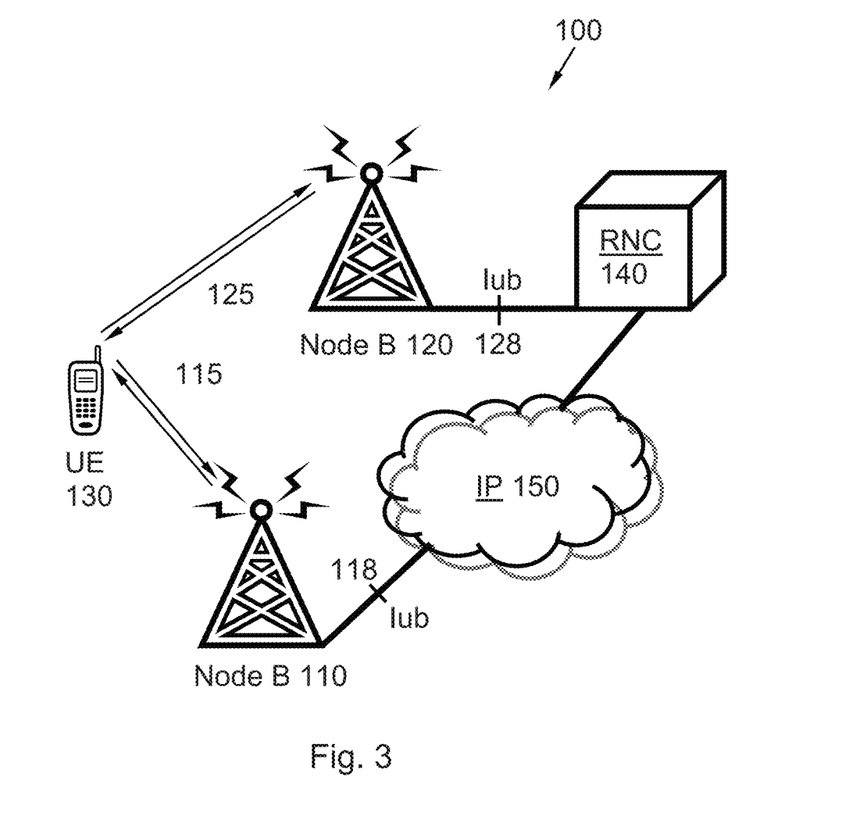
FIG. 3 is a schematic block diagram illustrating a radio access network according to some embodiments.

FIG. 3 is a schematic illustration over a radio access network 100. A first radio network node 110 and a second radio network node 120 are configured for transmitting/receiving signals to/from a user equipment 130 simultaneously, e.g. in a soft handover scenario.

The first radio network node 110 may communicate with the user equipment 130 over a first link 115 while the second radio network node 120 may communicate with the user equipment 130 over a second link 125.

The first radio network node 110 and the second radio network node 120 are connected to a controlling network node 140 over a respective backhaul link 118, 128, of which one backhaul link 118 is connected over an Internet Protocol (IP) network 150.

Although two radio network nodes 110, 120 are shown in FIG. 3, it is to be understood that another configuration of radio network nodes 110, 120 may be connected through, for example, a mobile switching centre and other network nodes, to define the radio access network 100. The radio access network 100 may comprise any other number and/or combination of radio network nodes 110, 120 and/or user equipment units 130, although only one instance of a user equipment 130 and two instances of radio network nodes 110, 120, respectively, are illustrated in FIG. 3, for clarity reasons. A plurality of radio network nodes 110, 120 and/or user equipment units 130 may further be involved in the present methods according to some embodiments.

Thus whenever "one" or "a/an" radio network nodes 110, 120 and/or user equipment 130 is referred to in the present context, a plurality of radio network nodes 110, 120 and/or user equipment units 130 may be involved, according to some embodiments.

Further, the radio network nodes 110, 120 may be referred to as e.g. a base station, Radio Base Station (RBS), Remote Radio Unit (RRU), an access point, a Node B, an evolved Node B (eNode B) and/or a base transceiver station, Access Point Base Station, base station router, femto node, pico node, home nodeB etc depending e.g. of the radio access technology and terminology used.

In some embodiments, the user equipment (UE) 130 may be represented by a wireless communication device, a wireless communication terminal, a mobile cellular telephone, a Personal Communications Systems terminal, a Personal Digital Assistant (PDA), a laptop, a computer, a computer tablet or any other kind of device capable of managing radio resources.

The radio access network 100 may be based on technologies such as e.g. Global System for Mobile Telecommunications (GSM), Code division multiple access (CDMA), Wideband Code Division Multiple Access (WCDMA), CDMA 2000, General Packet Radio Service (GPRS), High Speed Downlink Packet Data Access (HSDPA), High Speed Uplink Packet Data Access (HSUPA), High Speed Packet Data Access (HSPA), High Data Rate (HDR) etc, just to mention some none limiting examples.

The radio access network 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 3 is to provide a simplified, general overview of the methods, user equipment and network nodes herein described, and the functionalities involved. The methods, user equipment and network nodes will subsequently, as a non-limiting example, be described in a WCDMA environment, but the embodiments of the disclosed methods and network nodes may operate in a radio access network 100 based on another access technology such as e.g. any of the above enumerated. Thus, although the following embodiments are described based on WCDMA systems, it is by no means limited to WCDMA.

The radio access network 100 may further comprise a controlling network node 140. The controlling network node 140 may be e.g. a Radio Network Controller (RNC). The controlling network node 140 is a governing element in the radio access network 100, responsible for control of radio network nodes 110, 120, which are connected to the controlling network node 140. The controlling network node 140 may further for example carry out radio resource management; some of the mobility management functions and may be the point where encryption may be done before user data is sent to and from the user equipment 130.

The user equipment 130 may communicate with other user equipments, or network nodes not shown in FIG. 3, via any, some or all of the radio network nodes 110, 120 comprised within the radio access network 100.

According to some embodiments, the method described herein outlines improvements for macro diversity mechanisms when the links in the same active set experience different backhaul delay and jitter. Such different backhaul delay and jitter may be the result of having the backhaul link 118 over the internet 150 for at least one of the involved radio network nodes 110, 120. By providing the backhaul link 118 over the internet 150 it is possible to most conveniently attach a radio network node 110, 120 such as for example a femto node or home nodeB for example in an office or at home, without a particular backhaul network has to be provided. Thereby, it is possible to conveniently install/establish the radio network node 110, 120, just by attaching it to an internet connection, without necessity to provide a particular network infrastructure for communication between the controlling network node 140 and the radio network node 110, 120.

Embodiments herein relates to a method to compensate for differences in backhaul delay through adaptive buffering at the controlling network node 140 or radio network nodes 110, 120. Further, embodiments herein comprises maintaining radio link synchronization on multiple radio links, i.e., in soft handover when at least one link experiences too long a backhaul delay for simultaneous data transmission over the air to be feasible on all links in the active set. Also, some embodiments concerns prioritizing delay sensitive data on links with short backhaul delay, while transmitting less delay sensitive data on links having more favourable radio conditions. Furthermore, embodiments concerns avoiding unnecessary uplink Iub transmissions on backhaul links that are subject to a delay that exceeds the RLC retransmission timeout limit, meaning that it would be more efficient if the packet is received by another radio network nodes 110, 120, so that RLC retransmissions are avoided. Further, embodiments herein concerns balancing the level of buffering needed in the controlling network node 140 and the radio network nodes 110, 120.

Figure 4:
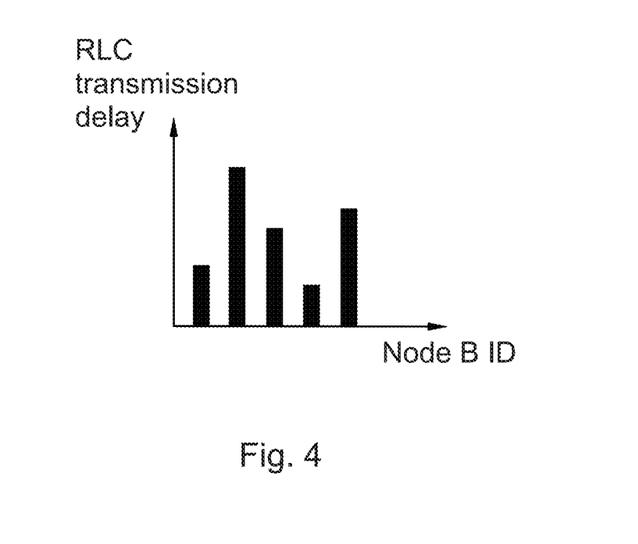
FIG. 4 is a schematic block diagram illustrating varying transmission delays of signals sent from different network nodes according to some embodiments.

FIG. 4 is a schematic illustration of different RLC transmission delays imposed with respect to different radio network nodes 110, 120 for their respective links in soft handover. It may be that the user equipment 130 is in soft handover and thereby connected to a plurality of radio network nodes 110, 120, each having different backhaul delay time. FIG. 4 thereby illustrates the problem underlying the methods herein, i.e. the problem that information transmitted from the controlling network node 140 to the radio network nodes 110, 120 propagate at different velocity and thereby arrive at different times at the radio network nodes 110, 120 (and vice versa).

In the description below, it shall be noted that additional buffering in the controlling network node 140 (see FIG. 3) according to some embodiments may as well be performed in the radio network nodes 110, 120. For this purpose a separate signalling of the required delay for each link may be conveyed to each radio network nodes 110, 120.

A number of cases A-G will subsequently be described, corresponding to some different embodiments, wherein the method has been implemented.

Case A, downlink DCH, no buffer limitations; Case B, downlink DCH, buffer limitations; Case C, uplink DCH, buffer limitations; Case D, downlink DCH, handling of delay sensitive traffic; Case E, uplink DCH, handling of delay sensitive traffic; Case F, uplink HSUPA; Case G, uplink DCH, RLC Acknowledged Mode.

These cases are described further below. Moreover a method to adaptively control buffer space in the radio network nodes 110, 120 or controlling network node 140 is proposed. Note that the DCH cases are valid for the A-DCH channel in HSDPA and for multi-RAB configurations containing DCH channels.

Case A (Downlink DCH, No Buffer Limitations)

The key idea of the first embodiment comprises to buffer data in the controlling network node 140 and to introduce a virtual delay on each link 115, 125 such that data may be received simultaneously at each radio network node 110, 120. The virtual delays may be based on measurements of the physical delays on each link initiated and compiled by the controlling network node 140. If a radio link is added or removed that has significantly longer or shorter delay than links in the current active set:

1. Calculate a new buffer time needed for each link (determined by the link experiencing longest delay), see FIG. 4 for a schematic illustration.
2. Update current frame protocol timers of new and existing radio links to align with the new maximum delay while ensuring a minimum of service interruption over the air interface.
3. Buffer data in the controlling network node 140 according to the expected difference in delay on different links (slow link transmitted first, etc).

Case B (Downlink DCH, Buffer Limitations)

According to a second embodiment, a scenario where the difference in delay between the best and worst backhaul link 118, 128 is higher than a buffer memory in the controlling network node 140 or radio network node 110, 120 allows. To still benefit from macro diversity the following actions may be performed in some embodiments:

1. Rank links 115, 125 according to radio quality
2. Find the subset of links, with delay difference less than the maximum buffering allows, that maximize expected downlink Signal to Interference Ratio (SIR) (posterior to data combining in the receiver of the user equipment 130).
3. For these links 118, 128, that have approximately equal Iub delay, the conventional frame protocol link timing adjustments and data transmission procedures are employed.
4. For the other links, do not send data frames over either Iub or the air interface. In addition, if the radio quality of these links is significantly worse compared to the links selected for data transmission, DPCCH transmission may be temporarily disabled, and as a last measure the radio link may be removed.

Observe that in case data frames are not transmitted in a certain radio link, Transmission Power Control (TPC) commands as well as—in case a parallel HSUPA transmission is ongoing for the same connection—L1 channels for relative grants, and HARQ ACK/NACK may still be transmitted. Adjustments to the power allocations of these channels, e.g. the power offsets of the pilot and TPC bits on the DPDCH, may be desirable in cases without data frame transmission to maximize the performance of the user equipment 130.

The radio link qualities may be determined using for example: mobility measurements reported via Radio Resource Control (RRC) signalling (such as CPICH Ec/N0, CPICH RSCP, or path loss), downlink Channel Quality Indication (CQI), ACK/NACK, or TPC statistics compiled in the radio network node 110, 120 and forwarded to the controlling network node 140, or downlink transmission power (available in controlling network node 140 for the sake of transmit power balancing).

Case C (Uplink DCH, Buffer Limitations)

In a third embodiment, again a scenario is considered where the difference in delay between the best and worst backhaul link 118, 128 is higher than buffer memory in the controlling network node 140 or radio network node 110, 120 allows. To still benefit from macro diversity while saving transport network resources where possible the following actions may be performed:
1. Rank links according to radio quality
2. Find the subset of links, with delay difference less than the maximum buffering allows, that maximize expected uplink decoding success (posterior to data combining in the RNC).
3. For these links, that have approximately equal Iub delay, the conventional frame protocol link timing adjustments and data transmission procedures are employed.
4. For the other links, do not send data frames over Iub.

The radio link qualities may be determined using for example: SIR, BER, BLER, ACK/NACK, grant request, happy bit, UE power headroom, or TPC statistics compiled in the radio network node 110, 120 and forwarded to the controlling network node 140.

Case D (Downlink DCH, Handling of Delay Sensitive Traffic)

Some information, such as the Signalling Radio Bearer, may be subject to a tight delay constraint. At the same time, the number of bits to be transmitted (e.g. per second) for such a delay sensitive channel might be quite low. This motivates a separate handling of some channels where spectral efficiency is compromised for delay.

The delay sensitive channels would then be transmitted without delay compensation in the radio network nodes 110, 120 that offers the shortest Iub delay, and potentially in other radio network nodes 110, 120 (for which the Iub delay difference is small enough compared to the radio network node 110, 120 with shortest delay). In radio network nodes 110, 120 with a delay that falls outside the current window that is accepted, the data frame may or may not be transmitted at all, depending on the potential need for additional redundancy, according to some embodiments.

To accomplish this behaviour, the radio network nodes 110, 120 acts differently depending on whether the buffering to handle delay differences is done in the radio network nodes 110, 120 or the controlling network node 140:
1. If buffering is done in the controlling network node 140, the radio network nodes 110, 120 associated with the shortest Iub delay is not aware of the additional buffering and thus no further actions may be acquired to achieve the correct timing over the air.
2. The additional buffering may be done in the radio network nodes 110, 120, a signalling information element is needed over Iub to inform the radio network nodes 110, 120 that the channel of interest may be exempted from the buffering. As a general implementation, each transport channel would be associated with a timing offset indicating the additional buffering (dictated by the controlling network node 140).

In conjunction with this, the transmit power may be increased to compensate for the lack of macro diversity combining gain according to some embodiments. The level of power boost may either be preconfigured in the radio network nodes 110, 120, or signalled by the controlling network node 140 over Iub. In the latter case the power difference could for example be calculated using the path loss difference between the subset of radio network nodes 110, 120 having short latency and the other radio network nodes 110, 120.

Case E (Uplink DCH, Handling of Delay Sensitive Traffic)

Case E concerns a similar situation as in case D above, which may applies to delay sensitive traffic on the uplink.

The delay sensitive channels may then be transmitted over Iub without delay compensation in the radio network nodes 110, 120 that offers the shortest Iub delay, and potentially in other radio network nodes 110, 120 (for which the Iub delay difference is small enough compared to the radio network node 110, 120 with shortest delay). In radio network nodes 110, 120 with a delay that falls outside the current window that is accepted, the data frame may or may not be transmitted at all, depending on the potential need for additional redundancy.

To accomplish this behaviour, the radio network node 110, 120 acts differently depending on whether the buffering to handle delay differences is done in the radio network node 110, 120 or the controlling network node 140:
1. If buffering is done in the controlling network node 140, the radio network node 110, 120 associated with the shortest Iub delay is not aware of the additional buffering and thus no further actions are needed.
2. If the additional buffering is done in the radio network node 110, 120, a signalling information element is needed over Iub to inform the radio network node 110, 120 that the channel of interest may be exempted from the buffering. As a general implementation, each transport channel would be associated with a timing offset indicating the additional buffering (dictated by the controlling network node 140).

In conjunction with this, the user equipment 130 transmit power may be increased to compensate for the lack of macro diversity combining gain. The level of power boost may be realized as an addition to the SIR target that is either preconfigured in the radio network node 110, 120, or signalled by the controlling network node 140 over Iub. In the latter case the SIR target addition may for example be calculated using the path loss difference between the subset of radio network nodes 110, 120 having short latency and the other radio network node 110, 120.

Case F (Uplink HSUPA)

While Cases A, B, and D above address downlink DCH transmissions, the performance of HSUPA radio bearers in soft handover may also be improved if Iub backhaul characteristics vary greatly within the active set. The problem at hand may comprise that if the backhaul delay of a certain radio link is too long, a packet (HARQ process) that has been acknowledged in the MAC-e layer by the radio network node 110, 120 might still cause an RLC retransmission because the RLC timer triggering the retransmission may still be exceeded. To mitigate the negative effects of an Iub delay being longer than the RLC retransmission timer allows, the following mechanism is proposed:

1. Let the controlling network node 140 inform the radio network node 110, 120 that Iub delay is currently too high compared to RLC timeout settings.
2. Send only HARQ NACK on the air interface in the corresponding radio network node 110, 120, although the HARQ packets may actually be received. As an effect, other radio network nodes 110, 120 may receive and acknowledge the HARQ processes.
3. Do not forward packets to the controlling network node 140 on the radio links experiencing excessive backhaul (in order to save backhaul link resources).

Observe that although data is not received in such a radio link, other important properties of soft handover are still realized: i.e., interference control and pilot channel synchronization.

Case G (Uplink DCH, RLC Acknowledged Mode)

Case G concerns the same situation as in the above described case F with erroneous triggering of RLC retransmissions may arise with uplink DCH when RLC is used in Acknowledged Mode and a similar procedure may be followed:
1. Let the controlling network node 140 inform the radio network nodes 110, 120 that Iub delay is currently too high compared to RLC timeout settings.
2. Send block error indications over Iub to the controlling network node 140. As an effect, other radio network nodes 110, 120 need to receive the uplink transmission correctly. If they do not, outer loop power control will trigger an increase in the SIR target to compensate.
3. Do not forward packets to the controlling network node 140 on the radio links experiencing excessive backhaul (in order to save backhaul link resources).

Observe that although data is not received via such a radio link, other important properties of soft handover are still realized: i.e., interference control and pilot channel synchronization.

Handling Varying Transmission Delay (Jitter)

According to yet some embodiments, the method of "pre-buffering" in the controlling network node 140 on the downlink is most likely not able to track too fast variations (jitter) in the Iub transmission delay. For this purpose buffering is still needed in the radio network nodes 110, 120.

To avoid having unnecessarily large static buffer allocations, a dynamic buffer memory space of the radio network nodes 110, 120 may be used for each link, according to some embodiments. As input, measurements of jitter are used, for instance n-times the standard deviation of the transmission delay (where n typically may be in the range of 2-4). The buffer length may be set so that packets are transmitted after this time has expired.

The radio network nodes 110, 120 buffer length is naturally updated for each link, e.g. periodically or if the situation has changed. A corresponding procedure may be directly applied in the controlling network node 140 for uplink transmission as well.

Figure 5:
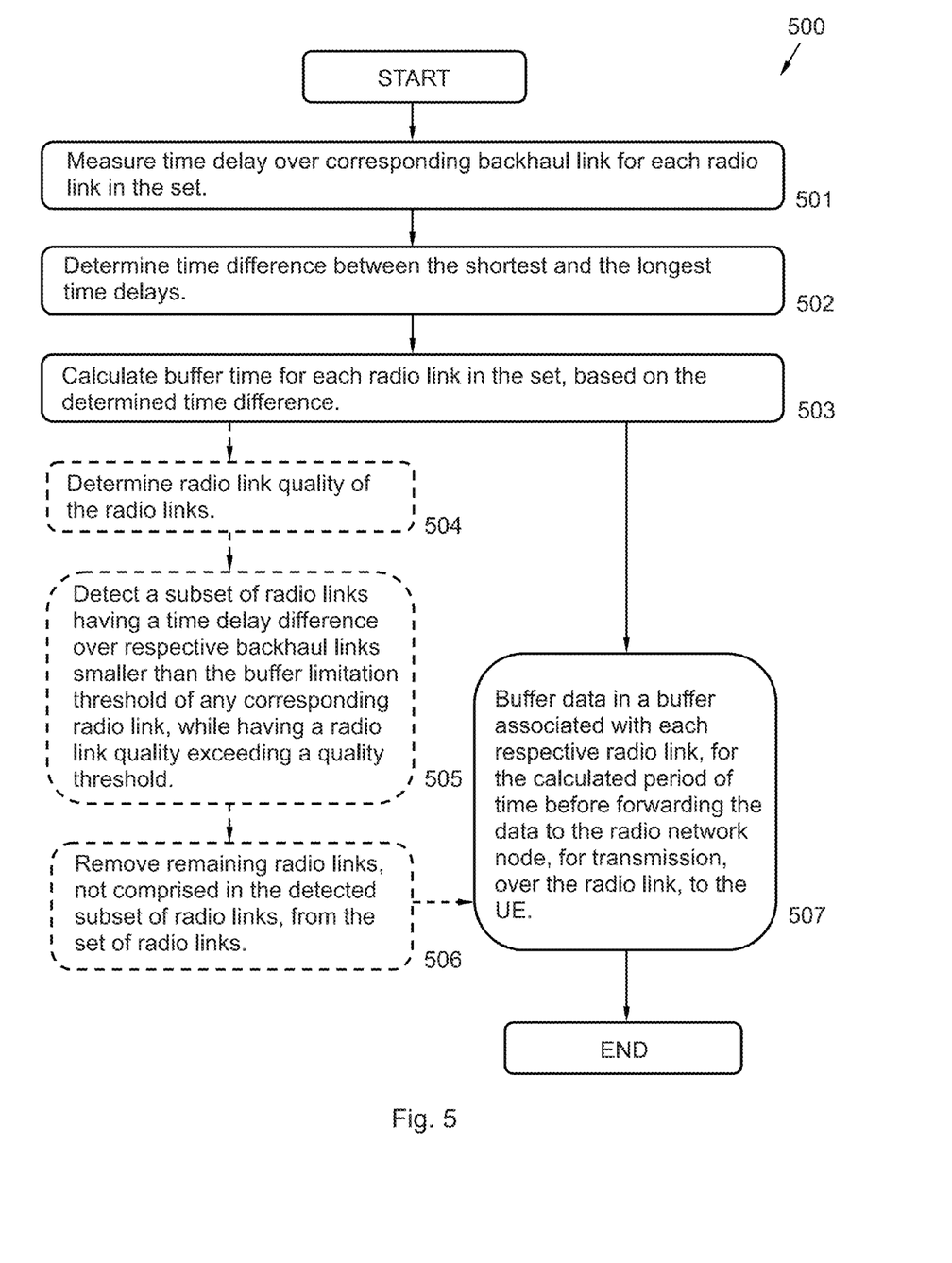
FIG. 5 is a schematic flow chart illustrating a method according to some embodiments.

FIG. 5 is a flow chart illustrating a method 500 in a controlling network node 140 in a radio access network 100. The method 500 aims at for transmitting data to a user equipment 130 over a set of radio links 115, 125, wherein each radio link 115, 125 is connected to the user equipment 130 and to a radio network node 110, 120. Thus the data is transmitted to be received by the user equipment 130 via the radio network node 110, 120 over the set of radio links 115, 125 between the radio network node 110, 120 and the user equipment 130. The method 500 is performed when one radio link 115, 125 is added, or removed, from the set of radio links 115, 125. Thus the method 500 may be performed when the user equipment 130 is in soft handover.

The controlling network node 140 is configured to communicate data to the respective radio network node 110, 120 over a respective backhaul link 118, 128, of which at least one backhaul link 118 is connected over an Internet Protocol (IP) network 150.

The radio access network 100 may be based on WCDMA or CDMA, according to some embodiments. Further, the radio access network 100 may be based on High Speed Uplink Packet Access (HSUPA) and/or RLC Acknowledged mode.

According to some embodiments, a radio link quality of the radio links 115, 125 may be determined based on mobility measurements reported via radio resource control signalling.

To appropriately transmit data to a user equipment 130 over a set of radio links from the controlling network node 140, the method 500 may comprise a number of actions 501-507.

It is however to be noted that the actions 501-507 may be performed in another chronological order than the enumeration indicates and that both of them, i.e. actions 501 and 502 may be performed simultaneously or in a reversed chronological order. Also, it may be noted that some actions, like for example 504, 505, and/or 506 may only be performed according to some embodiments. The method 500 may comprise the following actions:

Action 501

The time delay over the corresponding backhaul link 118, 128 is measured for each radio link 115, 125 in the set. Thus the time delay over the backhaul link 118, 128 that is utilised for each respective radio link 115, 125 in the set of active radio links 115, 125 is measured.

Action 502

A time difference between the shortest measured 501 time delay and the longest measured 501 time delay, is determined.

The amount of varying transmission delay over the backhaul link 118, 128 may in some embodiments be calculated by computing a standard deviation value and multiplying the standard deviation value with a factor in the range of 2-4.

Figure 7:
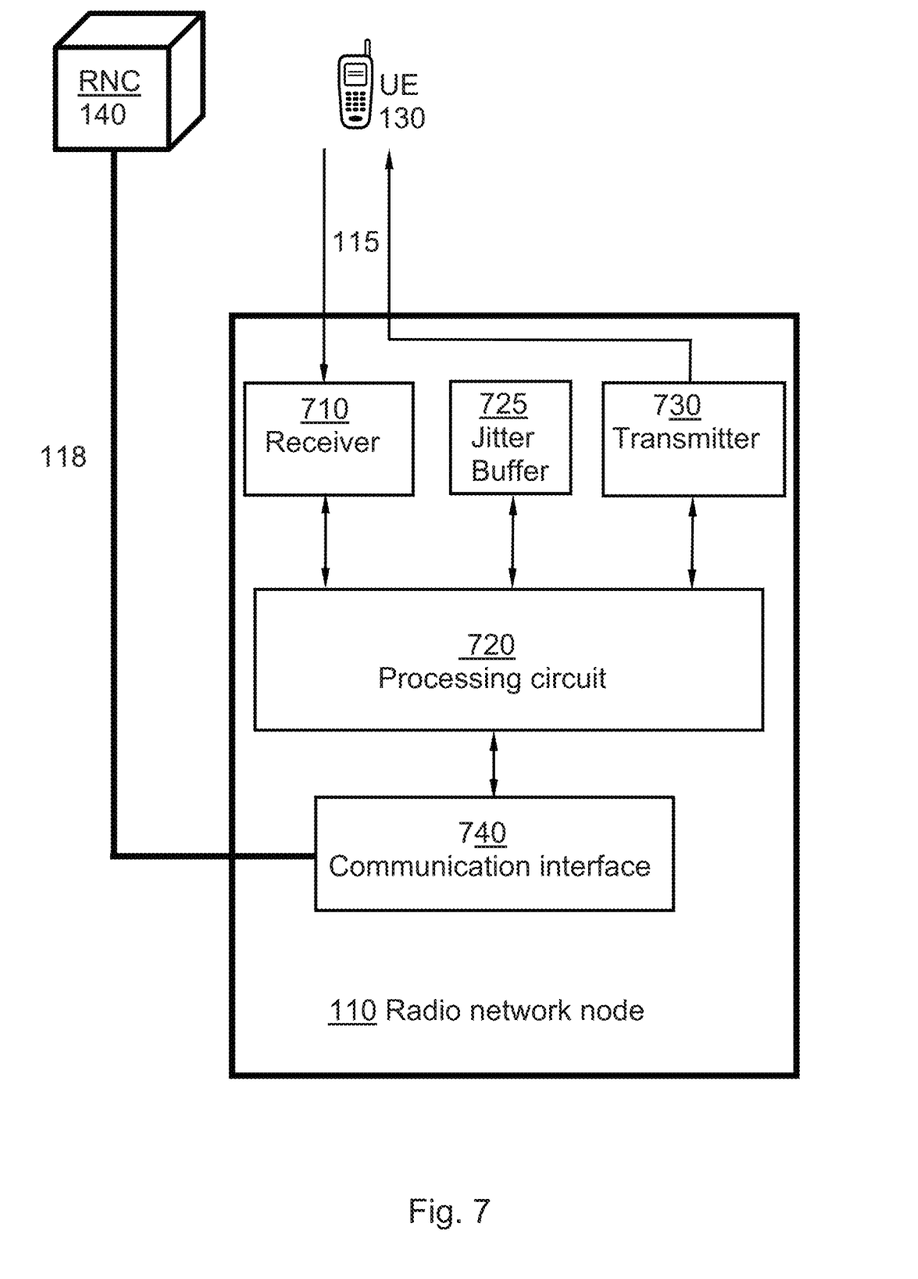
FIG. 7 is a schematic block diagram illustrating a radio network node according to some embodiments.

In some embodiments, a dynamic buffer memory space in a jitter buffer 725 in the radio network node 110, 120 may be allocated for each radio link 115, 125 based on the amount of varying transmission delay over the backhaul link 118, 128.

Action 503

A buffer time for each radio link 115, 125 in the set is calculated, based on the determined 502 time difference and the measured 501 time delay.

Action 504

This action may be performed according to some embodiments described herein.

A radio link quality of the respective radio links 115, 125 may be determined, in embodiments where the calculated 503 buffer time exceeds the buffer limitation threshold of any corresponding radio link 115, 125.

However, the radio link quality of the radio links 115, 125 may according to some embodiments be determined based on any of downlink channel quality indication, ACK/NACK or Transmission Power Control, TPC, statistics compiled in the respective radio network node 110, 120 and forwarded to the controlling network node 140.

The radio link quality of the radio links 115, 125 may in some alternative embodiments be determined based on downlink transmission power, available at the controlling network node 140.

However, the radio link quality of the radio links 115, 125 may further be determined based on any of Signal to Interference Ratio (SIR), Bit Error Rate (BER) Block Error Rate (BLER), ACK/NACK, grant request, happy bit, User Equipment (UE) power headroom, or TPC statistics compiled in the radio network node 110, 120 and forwarded to the controlling network node 140.

Action 505

This action may be performed according to some embodiments described herein.

A subset of radio links 115, 125 having a time delay difference over the respective backhaul links 118, 128, which is smaller than the buffer limitation threshold of any corresponding radio link 115, 125, while having a radio link quality exceeding a quality threshold level, may be detected.

Action 506

This action may be performed according to some embodiments described herein, wherein action 505 has been performed.

Remaining radio links 115, 125, not comprised in the detected 505 subset of radio links 115, 125, may be removed from the set of radio links 115, 125.

Action 507

Figure 6:
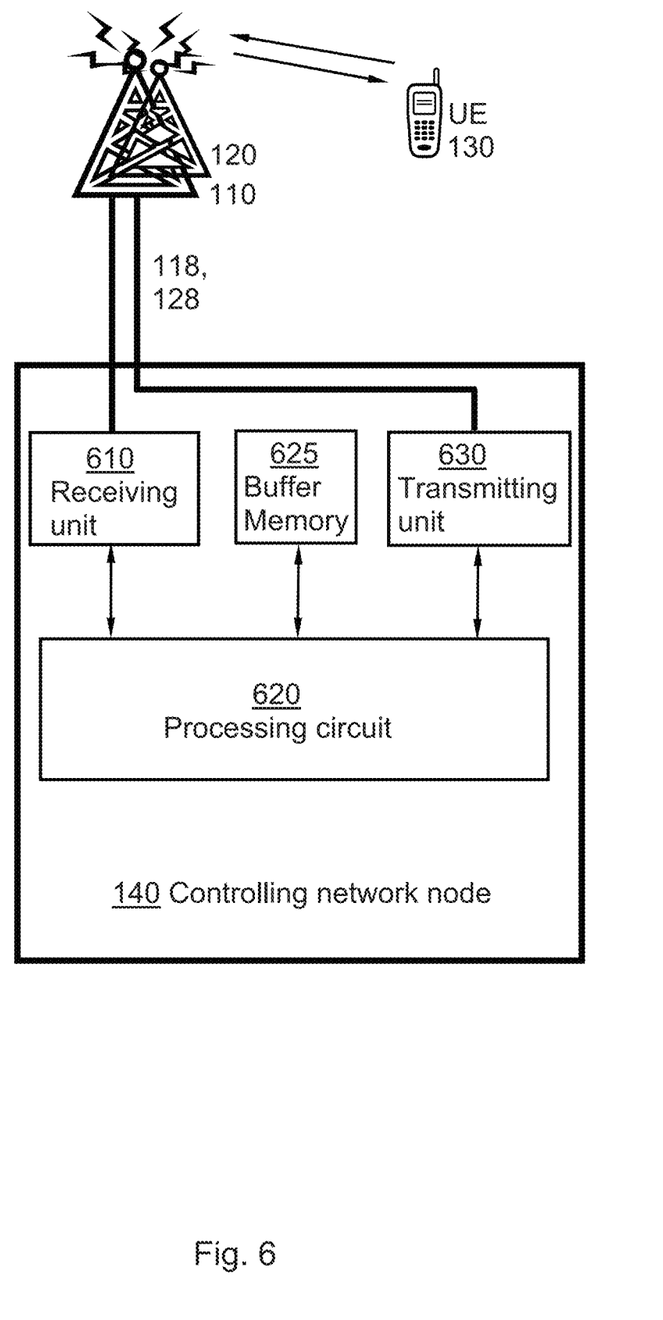
FIG. 6 is a schematic block diagram illustrating a controlling network node according to some embodiments.

Data is buffered in a buffer 625 associated with each respective radio link 115, 125, for the calculated period of time before forwarding the data to the radio network node 110, 120, for transmission, over the radio link 115, 125, to the user equipment 130.

According to some embodiments, data which is subject to a time sensitivity exceeding the determined 502 time difference between the respective backhaul links 118, 128 may be transmitted to the radio network node 110, 120 having the shortest delay time on the corresponding backhaul link 118, 128, without buffering the data.

The transmission of the time sensitive data may be made over the radio link 115, 125 having the shortest delay time on the corresponding backhaul link 118, 128, wherein the transmission power of the radio network node 110, 120 is increased during the transmission.

The buffering may be made at least partly in the radio network node 110, 120 according to some embodiments. Further, those embodiments may further comprise transmitting an indication from the controlling network node 140 to the radio network node 110, 120, indicating that the detected time sensitive data is to be excepted from buffering 507.

The transmit power of the user equipment 130 may be increased to compensate for lack of macro diversity combining gain, when transmitting time sensitive data.

According to some embodiments, upon detecting that the time delay over any of the backhaul links 118, 128 exceeds an RLC timeout setting, the radio network node 110, 120 may be instructed to transmit only HARQ NACK, or block error indications, over the radio link 115, 125 to be received by the user equipment 130.

The radio network node 110, 120 may in some embodiments refrain from forwarding uplink data, received from the user equipment 130, to the controlling network node 140 when the time delay over the backhaul link 118, 128 exceeds a threshold limit. Thereby, it is avoided to forward data which anyway may be obsolete upon arrival.

The buffering may be made in the buffer 625 situated at the controlling network node 140 in some embodiments. However, wherein the buffering may be made in the buffer 625 situated at the controlling network node 140 for a part of the data and in a buffer 725 situated at the radio network node 110, 120 for part of the data.

FIG. 6 illustrates a controlling network node 140 in a radio access network 100. The illustrated controlling network node 140 is configured to perform the method 500 for transmitting data to a user equipment 130 over a set of radio links 115, 125, when one radio link 115, 125 is added, or removed, from the set of radio links 115, 125. Each radio link 115, 125 is connected to the user equipment 130 and to a radio network node 110, 120, The controlling network node 140 is configured to communicate data to the respective radio network node 110, 120 over a respective backhaul link 118, 128, of which at least one backhaul link 118 is connected over an Internet Protocol (IP) network 150.

For enhanced clarity and in order not to render unnecessary complications for the reader to understand the functionality and advantages of the present method 500 and the involved controlling network node 140, any internal electronics of the controlling network node 140, not completely necessary for understanding the method 500 according to actions 501-507 has been omitted from FIG. 6.

The radio access network 100 may be based on WCDMA or CDMA, according to some embodiments. Further, the radio access network 100 may be based on High Speed Uplink Packet Access (HSUPA) and/or RLC Acknowledged mode.

According to some embodiments, a radio link quality of the radio links 115, 125 may be determined based on mobility measurements reported via radio resource control signalling.

The controlling network node 140 may in some embodiments be configured to communicate over the backhaul link 118, 128 with each radio network node 110, 120 involved in the set of radio links 115, 125 wherein each respective radio network node 110, 120 may have a dynamic buffer memory space in a jitter buffer allocated for each radio link 115, 125 based on the amount of varying transmission delay over the backhaul link 118, 128.

Such jitter buffer may thus, according to some embodiments be situated at each respective radio network node 110, 120 as will be further discussed in conjunction with presenting FIG. 7.

The amount of varying transmission delay over the backhaul link 118, 128 may be calculated by computing a standard deviation value and multiplying the standard deviation value with a factor in the range of 2-4.

To appropriately transmit data to a user equipment 130 over a set of radio links from the controlling network node 140, the controlling network node 140 comprises a processing circuit 620, configured for measuring the time delay over the corresponding backhaul link 118, 128 for each radio link 115, 125 in the set. The processing circuit 620 is also configured for determining a time difference between the shortest time delay and the longest time delay. In addition, the processing circuit 620 is further configured for calculating a buffer time for each radio link 115, 125 in the set, based on the determined time difference and the measured time delay.

The processing unit 620 may comprise a Central Processing Unit (CPU), processor, microprocessor, or processing logic that may interpret and execute instructions. The processing unit 620 may perform all data processing functions for inputting, outputting, and processing of data including data buffering and device control functions, such as call processing control, user interface control, or the like.

In addition, the controlling network node 140 comprises a buffer memory 625, configured for buffering data. The buffer memory 625 is associated with each respective radio link 115, 125, for the calculated period of time before the data is forwarded to the radio network node 110, 120, for transmission, over the radio link 115, 125, to the user equipment 130. The buffer memory 625 may be situated at the controlling network node 140.

The buffer memory 625 may provide permanent, semi-permanent, or temporary working storage of data and instructions for use by processing unit 620 in performing device processing functions. The buffer memory 625 may comprise ROM, RAM, large-capacity storage devices, such as a magnetic and/or optical recording medium and its corresponding drive, and/or other types of memory devices in different embodiments.

According to some embodiments, the processing circuit 620 may be further configured for determining when the calculated buffer time exceeds the buffer limitation threshold of any corresponding radio link 115, 125, and also configured for determining a radio link quality of the radio links 115, 125, and in addition also configured for detecting a subset of radio links 115, 125 having a time delay difference over the respective backhaul links 118, 128, which is smaller than the buffer limitation threshold of any corresponding radio link 115, 125, while having a radio link quality exceeding a quality threshold level, according to some embodiments.

The processing circuit 620 may further configured for removing remaining radio links 115, 125, not comprised in the detected subset of radio links 115, 125, from the set of radio links 115, 125.

Further, the processing circuit 620, may be configured for determining radio link quality of the radio links 115, 125 based on mobility measurements reported via radio resource control signalling in some embodiments.

Furthermore, the processing circuit 620 may, in some embodiments, be further configured for determining radio link quality of the radio links 115, 125 based on any of downlink channel quality indication, ACK/NACK or Transmission Power Control, TPC, statistics compiled in the respective radio network node 110, 120 and forwarded to the controlling network node 140.

The processing circuit 620 may be further configured for determining radio link quality of the radio links 115, 125 based on downlink transmission power, available at the controlling network node 140, in some embodiments.

The processing circuit 620 may further be configured for determining radio link quality of the radio links 115, 125 based on any of SIR, BER, BLER, ACK/NACK, grant request, happy bit, UE power headroom, or TPC statistics compiled in the radio network node 110, 120 and forwarded to the controlling network node 140 in some embodiments.

The processing circuit 620 may also be configured for determining that data which is subject to a time sensitivity exceeding the time difference between the respective backhaul links 118, 128 is to be transmitted to the radio network node 110, 120 having the shortest delay time on the corresponding backhaul link 118, 128, without buffering the data in the buffer memory 625, according to some alternative embodiments.

The processing circuit 620 may in addition be further configured for increasing transmission power of the radio network node 110, 120 is increased during the transmission of time sensitive data is made over the radio link 115, 125 having the shortest delay time on the corresponding backhaul link 118, 128.

According to some embodiments, the processing circuit 620 may be further configured for enabling buffering, at least partly in the radio network node 110, 120.

The processing circuit 620 may be further configured for inform the radio network node 110, 120, that the detected time sensitive data is to be excepted from buffering, in some embodiments.

The processing circuit 620 may be further configured for enabling the user equipment to increase transmit power of the user equipment 130 to compensate for lack of macro diversity combining gain, when transmitting time sensitive data.

The processing circuit 620 in some embodiments, may be further configured for instructing the radio network node 110, 120 to refrain from forwarding uplink data, received from the user equipment 130, to the controlling network node 140 when the time delay over the backhaul link 118, 128 exceeds a threshold limit.

The processing circuit 620 may further be configured for buffering data in the buffer 625 situated at the controlling network node 140. In some embodiments, the processing circuit 620 may be configured for both buffering data in the buffer 625 situated at the controlling network node 140 and for enabling buffering at the jitter buffer situated at the respective radio network node 110, 120.

The processing circuit 620 may be further configured for buffering part of the data in the buffer 625 situated at the controlling network node 140 and also buffering part of the data in a buffer situated at the radio network node 110, 120.

Furthermore, the controlling network node 140 may comprise a receiving unit 610. The receiving unit 610 may be adapted to receive information and data from associated radio network nodes 110, 120. The receiving unit 610 may be configured for wired or wireless communication in different embodiments.

In further addition, the controlling network node 140 may comprise a transmitting unit 630. The transmitting unit 630 may be configured for transmitting data and instructions to be received by the respective associated radio network nodes 110, 120. The transmitting unit 630 may be configured for wired or wireless communication in different embodiments.

The configuration of components of the controlling network node 140 illustrated in FIG. 6 is for illustrative purposes only. Other configurations comprising more, fewer, or a different arrangement of components may be implemented.

Further, it is to be noted that the described units 610-630 comprised within the controlling network node 140 are to be regarded as separate logical entities but not with necessity separate physical entities.

Any, some or all of the described units 610-630 may be comprised or co-arranged within the same physical unit. However, in order to facilitate the understanding of the functionality of the units 610-630 in the controlling network node 140 when performing the method 500, the comprised units 610-630 are illustrated as separate physical units in FIG. 6.

As a non limiting example only, the receiving unit 610 and the transmitting unit 630 may according to some embodiments be comprised within one physical unit, a transceiver, which may comprise a transmitter circuit and a receiver circuit, which respectively transmits outgoing radio frequency signals and receives incoming radio frequency signals, such as e.g. voice call and/or data signals, via an antenna. The antenna may be an embedded antenna, a retractable antenna or any antenna known to those having skill in the art without departing from the scope of the present solution. The signals transmitted between the controlling network node 140 and the radio network nodes 110, 120 may be wired or wireless and may comprise both traffic and control signals.

The present methods 500 in a controlling network node 140, for transmitting data to a user equipment 130 over a set of radio links 115, 125 may be implemented through one or more processing circuit 620 in the controlling network node 140, together with computer program code for performing the functions of the methods 500. The program code mentioned above may also be provided as a computer program product, for instance in the form of a data carrier carrying computer program code for performing the methods 500 according to actions 510-570 when being loaded into the processing circuit 620. The data carrier may be a CD ROM disc, a memory stick, or any other appropriate medium such as a disk or tape that can hold machine readable data. The computer program code may furthermore be provided as program code on a server and downloaded to the controlling network node 140 remotely.

Thus a computer readable medium encoded with a computer program for transmitting data to a user equipment 130 from a set of radio links 115, 125 may perform the method 500 according to actions 510-570.

Furthermore, the present methods 500 were described in part above with reference to flowchart illustrations and/or block diagrams of a controlling network node 140 methods, and computer program products according to embodiments described herein. It will be understood that each block of the various flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

FIG. 7 illustrates a radio network node 110 in a radio access network 100. The illustrated radio network node 110 is configured to communicate with the previously described controlling network node 140, and also with the user equipment 130. The communication with the controlling network node 140 over a backhaul link 118, which may be connected over an Internet Protocol (IP) network 150 in some embodiments.

The communication with the user equipment 130 is made over a radio interface. The radio access network 100 may be based on WCDMA or CDMA, according to some embodiments. Further, the radio access network 100 may be based on High Speed Uplink Packet Access (HSUPA) and/or RLC Acknowledged mode.

In order for the radio network node 110 to enable the controlling network node 140 to perform the described method 500, it may comprise a number of entities 710-740, which subsequently will be described.

The radio network node 110 comprises a receiver 710, for receiving wireless signals from other signalling entities such as e.g. the user equipment 130. Further, the radio network node 110 comprises a processing circuit 720. The processing circuit 720 may a Central Processing Unit (CPU), processor, microprocessor, or processing logic that may interpret and execute instructions. The processing circuit 720 may perform all data processing functions for inputting, outputting, and processing of data including data buffering and device control functions, such as call processing control, user interface control, or the like. Further, the radio network node 110 may comprise a jitter buffer 725. The jitter buffer 725 may comprise a dynamic buffer memory space, allocated for the radio link 115, 125 based on the amount of varying transmission delay over the backhaul link 118, 128, according to some embodiments. Further, according to some embodiments, the jitter buffer 725 may be configured for buffering part of the data to be transmitted to the user equipment 130. In addition, the radio network node 110 comprises a transmitter 730. The transmitter 730 may be configured for transmitting data and instructions to be received by the user equipment 130. The transmitter 730 may be configured for wireless communication according to different radio access technologies as the ones previously mentioned, in different embodiments. In further addition, the radio network node 110 comprises a communication interface 740, configured for transmitting and receiving information and data to/from the controlling network node 140, over a connection which may be wired, or wireless according to different embodiments. Furthermore, the connection may be over an IP network, according to some embodiments.

Further by means of example and in order to simplify the comprehension, the term SIR has been consistently used in this text when describing a Signal to noise and Interference Ratio, which is the ratio between the level of a desired signal to the level of background noise and signal disturbance. The higher the ratio, the less obtrusive is the background noise. However, there exist other acronyms which are sometimes used to describe the same or a similar ratio, like e.g. the Signal to Noise Ratio (SNR or S/N), Signal to Noise and Interference Ratio (SNIR), Signal to Interference and Noise Ratio (SINR) or an inversion of the ratio, like Interference to Signal Ratio, (ISR). Any of these or similar ratios may be used in the context of this description instead of the SIR.

Similarly, the link quality measurements BLock Error Ratio (BLER) and/or Bit Error Rate (BER) have been utilised herein. However, other acronyms which describe the same or similar measurements may be utilised instead, such as e.g. Frame Error Ratio (FER) and/or outage probability.

The terminology used in the detailed description of the particular exemplary embodiments illustrated in the accompanying drawings is not intended to be limiting of the present methods 500 and nodes 110, 120, 140. In the drawings, like numbers refer to like elements.

As used herein, the term "and/or" includes any and all combinations of one or more of the associated listed items.

As used herein, the singular forms "a", an and the are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

The word "information" as used herein is to be understood as meaning not only typographical letters but may also comprise pictures, images, photos, animations, graphics, maps, multimedia, movies, film sequences, sound, engravings, music, spoken words etc. which may be used for presenting a piece of information or a message to a user.

Unless otherwise defined, all terms comprising technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The invention claimed is:

1. A method, in a controlling network node in a radio access network, for transmitting data to a user equipment over a set of radio links when one radio link is added or removed from the set of radio links, wherein each radio link is connected to the user equipment and to a radio network node, wherein the controlling network node is configured to communicate data to radio network nodes over respective backhaul links, of which at least one backhaul link is connected over an Internet Protocol (IP) network, the method comprising:

measuring the time delay over the corresponding backhaul link for each radio link in the set;

determining a time difference between the shortest measured time delay and the longest measured time delay;

calculating a buffer time for each radio link in the set based on the determined time difference and the measured time delay;

buffering data, in a buffer associated with each respective radio link, for the corresponding calculated period of time before forwarding the data to the radio network node for transmission over the radio link to the user equipment;

in response to a calculated buffer time exceeding a buffer limitation threshold of a corresponding radio link:

determining a radio link quality of the radio links;

detecting a subset of radio links having a time delay difference over the respective backhaul links which is smaller than a buffer limitation threshold of any corresponding radio link while having a radio link quality exceeding a quality threshold level;

removing remaining radio links not in the detected subset of radio links from the set of radio links.

2. The method of claim 1 wherein the radio link quality of the radio links are determined based on mobility measurements reported via radio resource control signaling.

3. The method of claim 1: wherein the radio link quality of the radio links are determined based on statistics of at least one of the following: downlink channel quality indication;

ACK (acknowledgement)/NACK (negative acknowledgement);

Transmission Power Control (TPC);

wherein the statistics are compiled in a respective radio network node and forwarded to the controlling network node.

4. The method of claim 1 wherein the radio link quality of the radio links are determined based on downlink transmission power available at the controlling network node.

5. The method of claim 1:

wherein the radio link quality of the radio links are determined based on statistics of at least one of the following:

Signal to Interference Ratio (SIR);
Bit Error Rate (BER);
Block Error Rate (BLER);
ACK/NACK;
grant request;
happy bit;
power headroom of the user equipment;
Transmission Power Control (TPC);

wherein the statistics are compiled in a respective radio network node and forwarded to the controlling network node.

6. The method of claim 1 further comprising forwarding time sensitive data, which is subject to a time sensitivity incompatible with the determined time difference between the respective backhaul links, to a first radio network node having the shortest delay time on the corresponding backhaul link, without buffering the time sensitive data.

7. The method of claim 6 further comprising transmitting the time sensitive data from the first radio network node to the user equipment with increased transmission power from the first radio network node.

8. The method of claim 6 wherein the method further comprises the controlling network node transmitting an indication to the first radio network node indicating that the detected time sensitive data is to be excepted from any jitter buffering at the first radio network node.

9. The method of claim 1: wherein the radio access network is based on High Speed Uplink Packet Access (HSUPA) and/or RLC (radio link control) Acknowledged mode; wherein the method comprises, in response to detecting that the time delay over any of the backhaul links exceeds an RLC timeout setting, instructing the corresponding radio network node to transmit only HARQ NACK (hybrid automatic repeat request negative acknowledgement) or block error indications over the radio link to the user equipment.

10. The method of claim 9 wherein the radio network node refrains from forwarding uplink data, received from the user equipment, to the controlling network node when the time delay over the backhaul link exceeds a threshold limit.

11. The method of claim 1 wherein the buffering is made in a buffer situated at the controlling network node.

12. A controlling network node for transmitting data to a user equipment over a set of radio links in a radio access network when one radio link is added or removed from the set of radio links, wherein each radio link is connected to the user equipment and to a radio network node, wherein the controlling network node is configured to communicate data to radio network nodes over respective backhaul links, wherein at least one backhaul link is connected over an Internet Protocol (IP) network, the controlling network node comprising:

a processing circuit configured to:

measure the time delay over the corresponding backhaul link for each radio link in the set;

determine a time difference between the shortest time delay and the longest time delay;

calculate a buffer time for each radio link in the set based on the determined time difference and the measured time delay;

a buffer memory associated with each respective radio link, the buffer memory configured to buffer data for the corresponding calculated period of time before the data is forwarded to the corresponding radio network node for transmission over the radio link to the user equipment;

wherein the processing circuit is further configured to:

determine when the calculated buffer time of a radio link exceeds a buffer limitation threshold of the corresponding radio link;

determine a radio link quality of the radio links;

detect a subset of radio links from the set of radio links that each have a time delay difference over the respective backhaul links which is smaller than a buffer limitation threshold of any corresponding radio link, while having a radio link quality exceeding a quality threshold level;

remove remaining radio links not in the detected subset of radio links from the set of radio links.

13. The controlling network node of claim 12 wherein the processing circuit is configured to determine radio link quality of the radio links based on mobility measurements reported via radio resource control signaling.

14. The controlling network node of claim 12:

wherein the processing circuit is further configured to determine radio link quality of the radio links based on statistics of at least one of the following:

downlink channel quality indication;
ACK (acknowledgement)/NACK (negative acknowledgement);

Transmission Power Control (TPC);
wherein the statistics are compiled in the respective radio network node and forwarded to the controlling network node.

15. The controlling network node of claim 12 wherein the processing circuit is configured to determine radio link quality of the radio links based on downlink transmission power available at the controlling network node.

16. The controlling network node of claim 12:
wherein the processing circuit is further configured to determine radio link quality of the radio links based on statistics of at least one of the following:
Signal to Interference Ratio (SIR);
Bit Error Rate (BER);
Block Error Rate (BLER);
ACK/NACK;
grant request;
happy bit;
power headroom of the user equipment;
Transmission Power Control (TPC);
wherein the statistics are compiled in the radio network node and forwarded to the controlling network node.

17. The controlling network node of claim 12 wherein the processing circuit is configured to cause time sensitive data, which is subject to a time sensitivity incompatible with a time difference between the respective backhaul links, to be forwarded to a first radio network node having the shortest delay time on the corresponding backhaul link, without buffering the time sensitive data in the buffer memory.

18. The controlling network node of claim 17 wherein the processing circuit is configured to cause transmission of the time sensitive data from the first radio network node to the user equipment with increased transmission power from the first radio network node.

19. The controlling network node of claim 17 wherein the processing circuit is further configured to direct the first radio network node to exempt the time sensitive data from any jitter buffering by the first radio network node.

20. The controlling network node of claim 12: wherein the radio access network is based on High Speed Uplink Packet Access (HSUPA) and/or RLC (radio link control) Acknowledged mode; wherein the processing circuit is further configured to instruct the radio network node to transmit only HARQ NACK (hybrid automatic repeat request negative acknowledgement) or block error indications over the radio link to the user equipment in response to the time delay over any of the backhaul links exceeding an RLC timeout setting.

21. The controlling network node of claim 20 wherein the processing circuit is further configured to instruct the radio network node to refrain from forwarding uplink data received from the user equipment to the controlling network node when the time delay over the corresponding backhaul link exceeds a threshold limit.

* * * * *